March 5, 1946.  A. PAALU  2,395,937
TEMPERATURE INDICATOR
Filed July 10, 1942
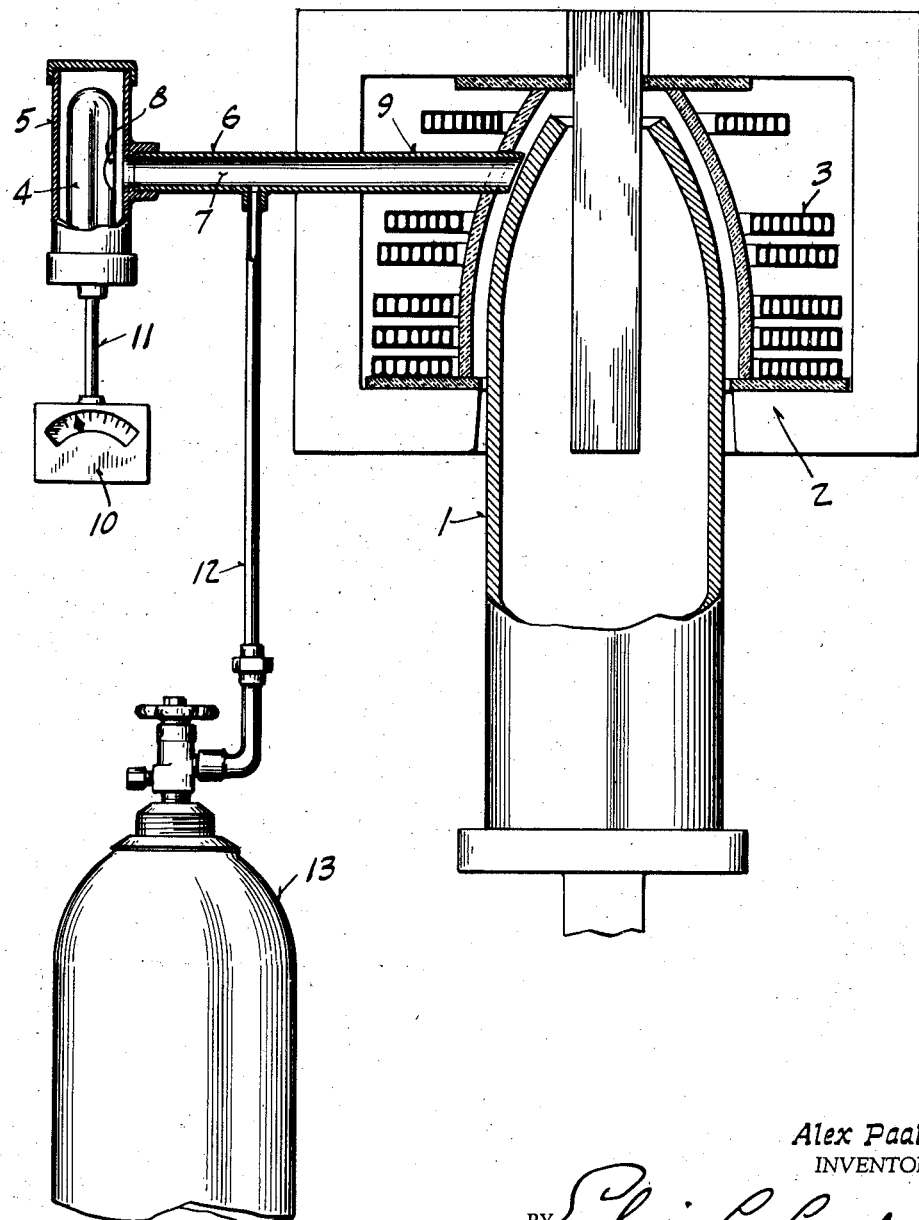
Alex Paalu
INVENTOR.
ATTORNEY.

Patented Mar. 5, 1946

2,395,937

UNITED STATES PATENT OFFICE 2,395,937

TEMPERATURE INDICATOR

Alex Paalu, Milwaukee, Wis., assignor to A. O. Smith Corporation, Milwaukee, Wis., a corporation of New York Application July 10, 1942, Serial No. 450,426

7 Claims. (Cl. 88—22.5)

This invention relates to a temperature indicator and more particularly to an indicator of the radiation type that may be employed to obtain the temperature of a metal blank, during the time when such blank is being subjected to a heat-treatment that requires an accurate knowledge of the temperature of the same.

Difficulty has been experienced in securing an accurate temperature of metal blanks during the time they are being subjected to heat-treatment. The best results are obtained if the temperature is taken directly from the blank itself. This has caused difficulty due to the fact that in many heat-treatment operations such as where induction heating is employed, scale due to oxidation forms on the outer surface of the metal blank being heated. The scale, particularly when loose, acts to insulate the metal blank, and temperature indications taken from such a scale-covered surface are lower than the true temperature of such blank. Where it is desired to heat blanks to a certain predetermined temperature and no higher, it becomes very important to obtain an accurate temperature reading. The invention generally is directed to this end.

One object of the present invention is to provide an accurate and sensitive temperature indicator for obtaining the temperature of a metal blank being subjected to heat.

Another object is to provide a temperature indicator of the radiation type that requires only a small field of view on a metal blank being heated to provide an accurate temperature reading for such blank.

Another object is to provide a temperature indicator that excludes scale from the temperature viewing spot on the heated blank to provide an accurate temperature reading.

Another object is to provide a method for the prevention of scale formation at a viewing spot on a metal blank disposed in a heating furnace.

These and other objects will appear from the following description of an embodiment of the invention illustrated in the accompanying drawing in which the single figure is a longitudinal section of a temperature indicator with a gas pressure tank, and showing the same as employed to obtain the temperature of a tubular member disposed in an induction furnace.

The invention is particularly adapted to be utilized in induction heating furnaces such as the one illustrated in the drawing. In such furnaces the blank is heated by reason of its resistance to the flow of electricity induced therein, and the outer surface is particularly susceptible to scale formation making it difficult to obtain an accurate temperature reading.

Referring to the drawing, the blank or tubular member 1 is disposed within the heating chamber of an induction furnace 2.

The furnace 2 has the primary induction coils 3 disposed therein to receive electric current from a source of power and energize the furnace in service. The furnace is capable of providing temperatures of at least 2400° F.

The temperature indicator of the invention illustrated in the drawing comprises a photoelectric cell 4 enclosed by a housing 5. One end of a generally cylindrical small diameter sighting tube 6 having an inner channel 7 projects through housing 5 and is disposed in direct alignment with window 8 provided on one side of photoelectric cell 4.

The other end 9 of tube 6 comprises the viewing end of the tube and is placed adjacent the blank or member 1 that is being subjected to heat. In the drawing illustrating the invention the greater extent of tube 6 is disposed within induction furnace 2, and end 9 of the tube rests at a point only slightly removed from a small area of the heated member 1, providing a restricted passage between the end of the tube 6 and the surface of member 1.

When the temperature indicator is in service as described, the energy radiated by blank 1 passes through channel 7 of tube 6, and thence through window 8 of the photoelectric cell 4. The cathode electrode under the influence of the radiation emits electrons to the anode in the cell to provide an electric current and thereby effect indications on a suitable instrument such as galvanometer 10 through connections 11. The deflection of the needle of the galvanometer by the current is dependent upon the intensity of the light traveling from the spot on member 1 to the cell 4. The temperature of the spot on the blank 1 is obtainable from instrument 10 by calibrating the deflections of the needle. Various radiation measuring devices may be employed to carry out the invention.

In order to eliminate the formation of scale on the spot viewed on blank 1, the invention keeps air from the spot and thereby prevents oxidation of the metal from taking place.

A conduit 12 is preferably secured to tube 6 at substantially any point between photoelectric cell 4 and viewing end 9 of the tube. Through conduit 12 non-oxidizing gas such as ordinary illuminating gas is flowed from a suitable source such as gas pressure tank 13 into channel 7 and thence out through viewing end 9 of tube 6. Illuminating gas is preferably employed because it is cheap and readily obtainable. Inert gases may, however, be utilized.

If illuminating gas is employed it becomes ignited at end 9 when the indicator is placed in service. The gas is discharged from viewing end 9 in sufficient volume to prevent air or oxidizing atmosphere from entering the restricted space between blank 1 and end 9. If a proper flow of gas is maintained, the air in the restricted space is swept away by the outflowing gas. The space between blank 1 and end 9 should be restricted to facilitate filling the space with such a volume of outflowing gas that no air can remain in contact with the spot being viewed. Where illuminating or other combustible gas is employed, restriction of the area between blank 1 and end 9 prevents burning of the gas in contact with the spot being viewed and instead the flame of burning gas will occur around the space at the outer circumference of the tube, where it does not modify the radiation from the blank 1 to cell 4.

The invention substantially eliminates any scale on the heated blank 1 at the viewing spot, and the radiation waves from the latter are free to travel to the photoelectric cell 4 without absorption by scale.

The temperature reading obtained from the calibrated instrument 10 is rendered substantially accurate and the operator is able to heat a blank to the desired temperature without endangering the success of the operations by inaccurate temperature readings.

Although the description refers to conduit 12 in conjunction with tube 6 as the means for introducing gas to the viewing end of tube 6, it is not intended to limit the introduction of gas to this manner. It is possible to introduce the gas at the viewing end 9 by means independent of tube 6 or it is also possible to employ a concentric or other pipe arrangement with one pipe acting as a viewing tube and the other as a conduit for the gas to reduce and eliminate scale from the blank.

Various embodiments of the invention may be employed within the scope of the accompanying claims.

I claim:

1. In combination with a furnace for heating an article to a predetermined temperature in the presence of air normally effecting oxidation of the surface of the article, a temperature indicating device responsive to radiations from a defined area of the surface of the article being heated, a source of non-oxidizing gas, and means connecting said source of gas to the furnace and for supplying the gas thereto in a volume and under a pressure sufficient to blanket said defined area of the surface of the article and exclude air therefrom to prevent oxidation of the surface of the article in the defined area relied upon for the radiations referred to.

2. In combination with a furnace for heating an article to a predetermined temperature in the presence of air normally effecting oxidation of the surface of the article, a temperature indicating device responsive to radiations from the surface of the article being heated, a source of illuminating gas, a conduit for conducting said gas from said source to a point of discharge in said furnace, and means regulating the volume and pressure of gas passing through said conduit to effect a blanketing of the surface of the article to exclude air therefrom in the area relied upon for the radiations referred to.

3. The method of ascertaining the temperature of a heated blank, which comprises blanketing a small surface area of said blank with a non-oxidizing gas to exclude air from contact with the same, transmitting light waves from said blanketed area to a point removed therefrom, and translating the transmitted waves into a temperature indication.

4. The method of ascertaining the temperature of a heated oxidizable blank, which comprises blanketing the surface of said blank with a non-oxidizing gas to exclude air from contact with said surface, transmitting light waves from said blanketed surface to a point removed therefrom, and photoelectrically translating the transmitted light waves into a temperature indication.

5. The method of ascertaining the temperature of a heated oxidizable blank, which comprises blanketing a small surface area of said blank with a non-oxidizing gaseous atmosphere that does not restrict the radiation of light waves therefrom, transmitting light waves from said surface through said blanketing atmosphere and through a tubular member to a point removed from said surface, and photoelectrically translating the light waves transmitted to said point into a temperature indication.

6. A temperature indicator for accurately obtaining the temperature of a spot on the surface of a heated metal blank, which comprises a radiation transmitting tube open at one end to be disposed adjacent the surface of the blank and transmit radiation therefrom, means at the other end of the tube for receiving and translating said radiation into temperature indications, a source of combustible gas, and means connecting said source to said tube intermediate the ends thereof and for discharging said gas from the open end of said tube in sufficient volume and at sufficient pressure to blanket the spot being viewed and exclude air therefrom, the combustible gas serving to take up the oxygen of the adjacent air by burning and thereby to protect the spot from oxidation.

7. A temperature indicator for accurately obtaining the temperature of substantially any spot on a heated metal blank, which comprises a radiation transmitting tube to transmit radiation from said blank, means to translate the radiation into temperature indications, a source of non-oxidizing gas, and means connected to said source and said transmitting tube to supply protective non-oxidizing gas from said source through the end of said transmitting tube adjacent the spot being viewed in such volume and under such pressure as to blanket said spot and exclude air therefrom and prevent oxidizing atmosphere from flowing to said spot and modifying the radiation therefrom in a manner giving an untrue temperature indication by reason of oxidation of the surface of the blank at said spot.

ALEX PAALU.